United States Patent
Thomas (10) Patent No.: US 8,237,556 B2
(45) Date of Patent: Aug. 7, 2012

(54) SYSTEM FOR SIMULTANEOUS RELEASE OF SAFETY BELT LATCHES

(76) Inventor: Gary D. Thomas, Ballwin, MO (US)

( * ) Notice: Subject to any disclaimer, the term of this patent is extended or adjusted under 35 U.S.C. 154(b) by 120 days.

(21) Appl. No.: 12/755,036

(22) Filed: Apr. 6, 2010

(65) Prior Publication Data

US 2010/0186203 A1 Jul. 29, 2010

Related U.S. Application Data

(63) Continuation-in-part of application No. 11/700,721, filed on May 4, 2007, now abandoned, and a continuation-in-part of application No. 11/998,789, filed on Dec. 3, 2007, now abandoned.

(51) Int. Cl.
*B60Q 1/00* (2006.01)

(52) U.S. Cl. ............. 340/457.1; 340/457; 340/686.1; 340/687; 340/686.2; 340/686.4

(58) Field of Classification Search ............. 73/862.391; 280/735, 801.1; 340/457.1, 686.1, 687, 686.2, 340/686.4, 457

See application file for complete search history.

(56) References Cited

U.S. PATENT DOCUMENTS

| 5,362,087 | A | 11/1994 | Agid |
| 6,554,092 | B2 | 4/2003 | Midorikawa |
| 6,938,959 | B1 | 9/2005 | Borunda |
| 2002/0038573 | A1* | 4/2002 | Clark ...................... 73/862.391 |
| 2002/0124649 | A1* | 9/2002 | Kim et al. ................... 73/432.1 |
| 2002/0167157 | A1* | 11/2002 | Matsumoto et al. .......... 280/777 |
| 2008/0290644 | A1* | 11/2008 | Spahn et al. ................. 280/806 |

* cited by examiner

*Primary Examiner* — Daryl Pope (74) *Attorney, Agent, or Firm* — Charles McCloskey (57) ABSTRACT

A system releases seat belts on school buses electronically via driver command or automatically by an inertia switch and electronic timer that then activate solenoids at each seat. This system operates on 12V direct current furnished by the load side of the bus's ignition switch. The system also has a level sensor that prohibits the system from energizing the solenoids when a bus equipped with the system does not have an upright position. The system provides a switch under each seat that notifies the driver when a child occupies it or a light at the dashboard. A second light flashes to notify the driver when the clip engages a buckle of each seat on a bus. The system allows for normal daily usage of seat belts and simultaneously releases the seat belts in an emergency.

11 Claims, 6 Drawing Sheets

SYSTEM FOR SIMULTANEOUS RELEASE OF SAFETY BELT LATCHES

CROSS-REFERENCE TO RELATED APPLICATION

This non-provisional application is a continuation in part of the pending non-provisional application for patent having the Ser. No. 11/700,721 filed on May 4, 2007 now abandoned, and a continuation in part of the pending non-provisional application for patent having the Ser. No. 11/998,789 filed on Dec. 3, 2007 now abandoned, which are both owned by the same inventor.

BACKGROUND OF THE INVENTION

The seat belt release latching system relates to personnel safety belts in vehicles and more specifically to a plurality of solenoids that simultaneously depress the release buttons of seat belt clips upon command.

Across the country, children board school buses to take them to and from school. A school bus follows a route through a few neighborhoods and then transports the children to school. After the school day, the school bus returns children home. Presently, most school buses lack seat belts. However, school busses lessen the risk to their passengers through bright yellow exterior paint, a noticeable lighting system, and strict laws for motorists operating other vehicles in the immediate vicinity of school busses.

Following manners and school district rules, children are expected to board a school bus and take their seat without delay. Children though sometimes straggle to their seat as they finish awakening or chat with friends as they walk down the aisle of a school bus. Children occupying their seats slowly also lengthen the time of the school bus on its route. Bus drivers generally note the habits of their regular passengers and can motivate sluggish children to take their seats.

Presently school buses have padded seat cushions and seat backs but do not have seat belts for the children. Children encounter seat belts in other vehicles though. Younger children likely have a booster seat by reaching the age of kindergarten. Booster seats secure the child to the vehicle by raising the child upon a seat so the lap and shoulder belts, provided with the vehicle, occupy proper locations across the body of the child when used. A parent, or skilled child, pulls the metal clip which pulls the lap belt across the waist of the child and the shoulder belt over one shoulder of the child as is known. The parent or skilled child then puts the metal clip into the buckle for securement. Older children occupy seats normally, that is, by sitting in them without a booster. The older children pull the metal clip and directly extend the lap belt and the shoulder belt across themselves. The older children then secure the clip into the buckle. Of course, a parent or other adult in a vehicle may have to remind children to secure their belts. In the event of an accident, usage of a seat belt, with or without a booster seat, prevents ejection of a child from the seat and resulting serious injuries. Once the vehicle comes to rest after an accident, first responders can then remove the seat belts to free a child from the vehicle.

DESCRIPTION OF THE PRIOR ART

However, seat belts deployed on a school bus may restrain children in a bus following an accident. The number of children in seat belts may prevent first responders from rapidly releasing the seat belts from the children and evacuating them from the bus in an orderly manner. One of the problems the Applicant encountered when incorporating a seat belt into a non-latched system includes releasing the seat belts on school buses and other motor coaches before a child panics. Existing busses have a non-latched system with bars or other mechanisms beneath the seats of children occupied when a school bus moves. A non-latched seat belt system performs adequately, except when a child panics after an accident and can not open his bar or other mechanism to exit from a school bus.

Unfortunately, nearly all school buses driving these days lack a seat belt system for child passengers. Select school buses that have seat belts, primarily for the driver, have a two belt system without any indicators for non-use of the belts. The driver knows whether she has buckled her seat belt and may have a buzzer if a sensor detects that the driver's belt remains unbuckled as is common in cars and light trucks. However, the driver lacks any indicator that an existing bar or other mechanism has engaged to retain children in their seats.

Various seat belt and release patents have appeared over the years. The U.S. Pat. No. 6,554,092 to Midorikawa describes a seat belt device. The device has a motorized spool that takes up and lets out seat belt webbing under computer control. Though this device allows for letting out a seat belt following an accident, the device does not separate the lap/shoulder belt from a buckle and lacks inertial switches.

The U.S. Pat. No. 5,372,087 to Agid illustrates a snow board with an electronic release apparatus. The apparatus includes a lock member 50 that engages a recess 54 so that a strap remains secured. Upon activation of a transmitter, a solenoid 60 energizes and withdraws the lock member from the recess, releasing the strap and freeing a foot of a snow board user.

And Borunda has U.S. Pat. No. 6,938,959 for a bus seat belt system. This system has a seat with a backrest and two combination lap and shoulder belts. The lap and shoulder belts connect upon a common ring using hook and loop fasteners for ready release.

The present invention overcomes the disadvantages of the prior art and provides solenoids in electrical communication with a control so that all of the solenoids release simultaneously upon command from the control.

SUMMARY OF THE INVENTION

Generally, the seat belt release latching system is an electronic system that will release seat belts on motor coaches, particularly school buses, via driver intervention or automatic release initiated by an inertia device and electronic timer. Preventing panic and providing for release of seat belts, this system would automatically release the seat belts via the driver or timed release through a control center. The system operates on 12V direct current furnished by the load side of the bus's ignition switch and an in-line fuse protects the system.

The system will also activate via a signal from an inertial assembly switch and an electronic timer that energizes a plurality of solenoids after a certain time so that the system releases the clips from the buckles of the seat belts following a traffic accident. The system also has a level sensor that prohibits the system from energizing the solenoids when a bus equipped with the system does not have an upright position. The level sensor suppresses automatic activation of the system that prevents inadvertent opening of the seat belts when a school bus so equipped has tilted, rolled, or no longer remains upright following a traffic accident. The system allows for normal daily usage of each seat belt and provides for simultaneous release of all seat belts on a bus in an emergency situation.

The invention also includes a switch under each child's seat that notifies the driver when a child occupies a seat. Further, a light indicator will also notify the driver when a seat has a child sitting in it too. A second indicator light will then flash to the driver when the clip engages a buckle of each seat on a bus. The various indicator lights have a common mounting location within the driver's field of vision, proximate the dashboard.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the seat belt release latching system is to provide a system that can be readily attached to existing vehicle seat belts that activates in an emergency.

Another object of the seat belt release latching system is to provide such a system that readily provides complete control of the system by the driver to activate the system.

Another object of the seat belt release latching system is to provide such a system that allows for the school bus itself to activate the solenoid release primarily through automatic inertia switching.

Another object of the seat belt release latching system is to provide such a system that has a low cost of manufacturing so the school districts and fleet operators can readily purchase the system through existing sales outlets.

Another object of the seat belt release latching system is to provide such a system that allows for school districts and fleet operators to control the costs of equipment and parts over the lifecycle of the system.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
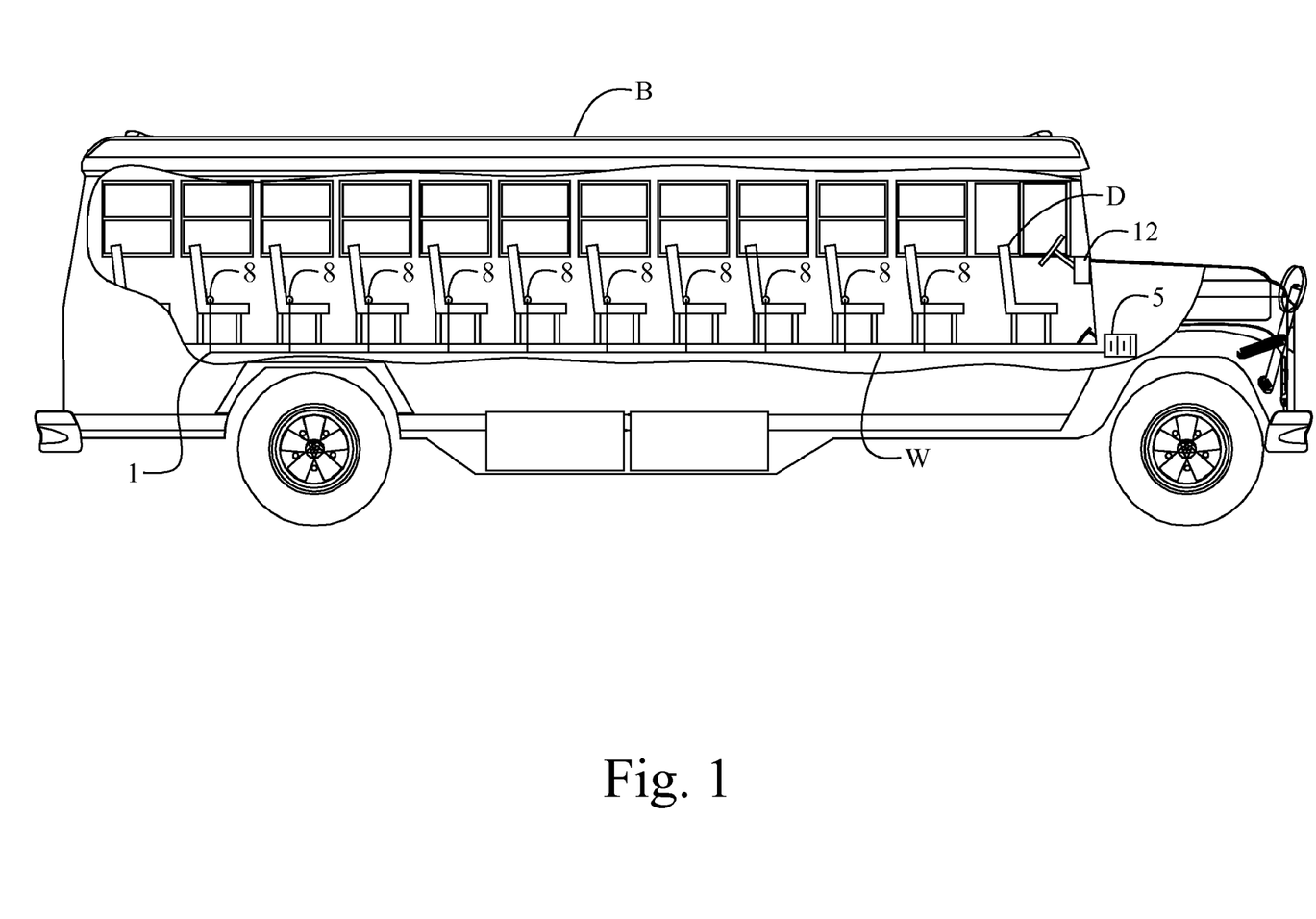
FIG. 1 shows a representation of a school bus with the present invention deployed.

The present invention overcomes the prior art limitations by providing a system 1 that allows a driver of a passenger carrying vehicle, such as a school bus B or automobile, or the vehicle itself, to release the safety belt latches of all of the passenger seats in the vehicle. The passenger carrying vehicle is shown in FIG. 1. The seat belt automatic release system has an elector-mechanical configuration that will release all of the seat belts on a school bus or motor coach following an accident. The system communicates through wiring W and activates solenoids 8 mounted at each seat upon human intervention, as at controls 12 proximate the driver's seat D, or automatically by sensors, as at 5, triggered during an accident.

Figure 2:
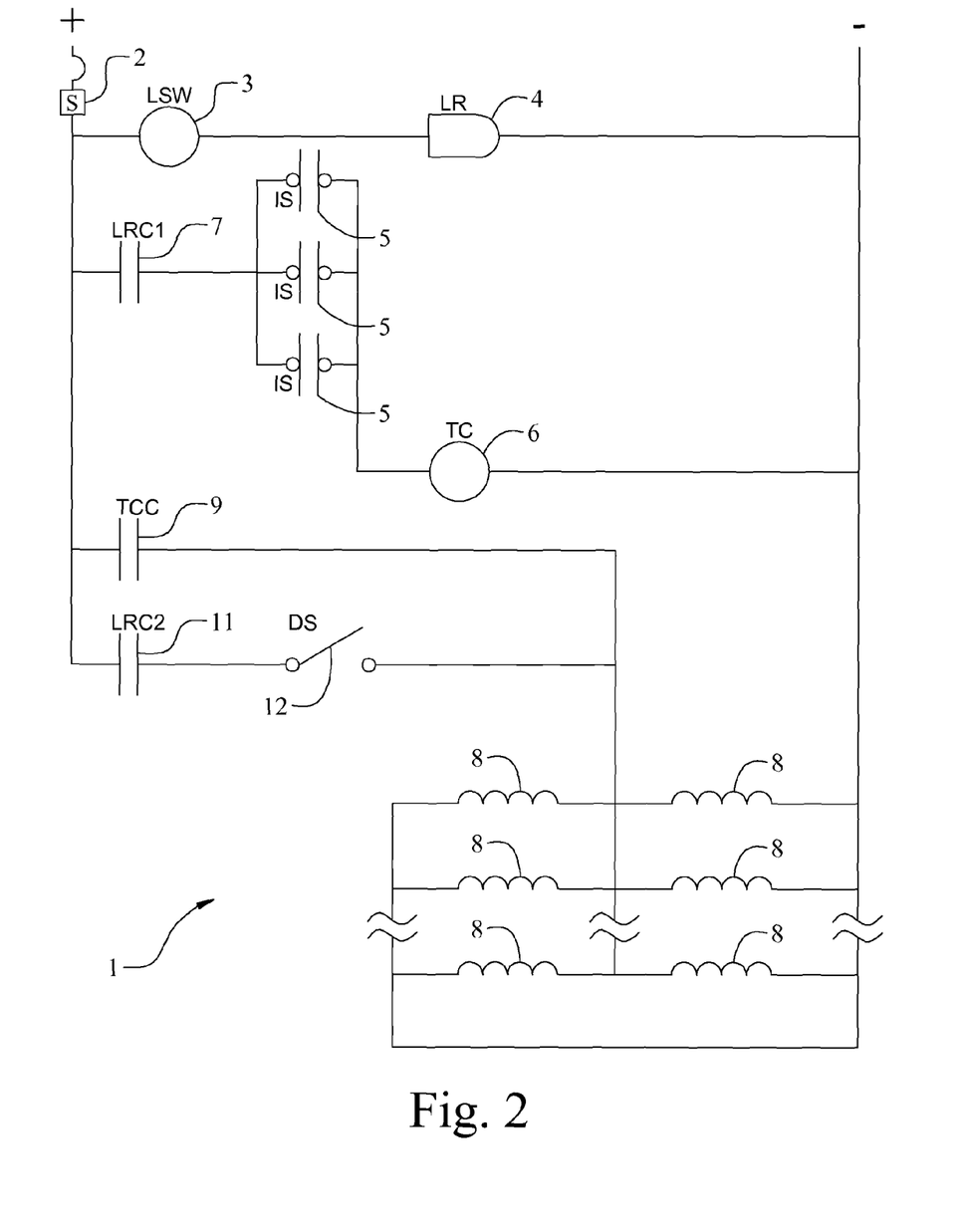
FIG. 2 shows a circuit diagram of the solenoids of the invention deployed upon a vehicle.

An introductory description of components for the system 1 refers to FIG. 2, a circuit diagram of the present invention. A fuse, as at 2, is an inline cartridge, 12 VDC, with amperage that varies according to the size of each school bus B, primarily the length as determined by the number of seats. A Level Switch Control, as at 3, abbreviated LSW, has an operating angle of approximately 1 to approximately 80 degrees, when the switch is tilted gradually, at an approximate rate of 1 degree per second from a horizontal plane, often the plane upon which a vehicle equipped with the invention travels. The LSW then has a returning angle of more than 25 degrees, when the switch is tilted gradually at an approximate rate of 1 degree per second from a horizontal plane. The LSW also has a permissible mounting level of 1 degree maximum from a horizontal plane. The LSW incorporates a contact form of a single pole single throw with NC contact and slow action. The LSW has electrical ratings of 5 VDC, 0.1 mA to 30 VDC, 100 mA under a resistive load. The LSW then operates in a temperature range of −25° F. to +60° F. without icing and condensation and a humidity range of 45 to 95% RH. And, the LSW has a sealed enclosure with an output capacity from 0.1 A at 5 VDC to 100 mA at 30 VDC.

Then the invention includes a B LR, that is, a Level Relay as at 4, for power. The relay has DPDT 12 VDC 10A characteristics and a Z800-ND MK2P-S-DC12 model number. The relay also has MK DPDT Connecting Sockets—Panel Mount Z836-ND PL08 and DPDT Connecting Sockets—PCB Mount Z837—ND PLE08-0. As its operating characteristics, the relay has an ON start Supply Voltage—12 VDC and 8-pin models—H3cr-F8N 12 DC with Flicker ON start. The relay has mounting method both surface and flush. The relay operates upon 12 VDC and at a continuous rate. The relay has a power consumption of approximately 1 Watt at 12 VDC and has an impulse withstand voltage of 1.5 kV for 12 VDC. The relay has an ambient operating temperature of −10° C. to 55° C. with no icing.

The Level Relay 4 driven by the LSW 3 closes both the LRC1 and LRC2 contacts as later described. Closing of these contacts energizes the solenoids for both driver activation of the invention and inertial switch operation of the invention.

The present invention also utilizes an Inertia Switch, abbreviated IS, as at 5. The inertial switch assembly is composed of a plastic one inch acrylic rod with a ¼ inch by 8 inch track cut into the rod. A plastic sleeve cylinder that fits over the solid rod has an inside diameter of 1⅛ inch and an outside diameter of 1¼ inch. This sleeve provides a mounting base for the switch that will close the circuit and thus indicate a bus accident. The description of the preferred embodiment is only based on three switches. Additional numbers of switch assemblies may require installation based upon the configuration of the front end a particular bus. Each Inertia Switch is a micro switch, or an equivalent 12 VDC switch, with a roller ball lever that will ride an inner rod and activate when the roller ball drops into a groove on a solid inner rod. The inner rod attaches to the bumper assembly of the school bus. An accident involving the bus will then move the groove and trigger the switch, such as when the Inertia Switch tilts less than approximately 30 degrees from a horizontal plane, often the surface upon which a vehicle B travels. The outer sleeve also attaches to the frame of the bus. A single pole single throw switch has parallel wiring to another inertial switch so any switch will trigger the circuitry and components of the invention that cooperate to release the seat belts and allow the children or other passengers to escape the bus.

The invention also has a timer, abbreviated TC, as at 6, that has four selective modes. The timer has an Off Delay setting function of Spot 0-10 min with 12 VDC input and output over a 10 Amp output current. The timer also has a w/Z882-ND SPOT mounting socket and the timer is OMRON or equivalent.

The system has two separate control paths for seat belt automatic release, see FIG. 2. Both paths will receive the 12 Volt direct current from the level switch control, LSW, via the level relay 4. For a Circuit A, the level switch control will prevent the solenoids from being energized if the bus is upside down. The level relay contacts, as at 7, abbreviated LRC1, will furnish power to the inertia control mechanism 5 for automatic switching due to an accident. The inertia controls will energize the time control, or timer 6, so all of the solenoids 8 have sufficient time to energize and release the seat belt latches. The inertia controls delay the delivery of power to the solenoids following an accident of vehicle B so long as the vehicle is tipping 30° or less from a horizontal plane. The voltage will be switched through a time control contact, as at 9, abbreviated TCC. The time control contact 9 will switch and deliver the 12V direct current directly to the solenoids 8 used to push the release mechanism on a female connector of an existing seat belt.

The system 1 also has a driver controlled section, or Circuit B, operated from the driver's seat D, where the level switch also furnishes voltage via the level contacts, as at 11, abbreviated as LRC2, to a driver switch, as at 12. As a summary, the Level Relay 4 driven by the LSW 3 closes both the LRC1 and LRC2 contacts. Closing these contacts energizes the solenoids for both driver activation of the invention and inertial switch operation of the invention. The driver switch 12 located in the dashboard as shown in FIG. 1 allows a driver to manually energize the solenoids from the cab. During operation of a bus or other passenger vehicle, the driver energizes the system via a mechanical hold switch 12, that is, push-on, push off. The load side of the switch furnishes the voltage to energize the individual solenoids 8 deployed at each seat. The switchgear as at 12 includes illuminated indicators to show when passengers have not engaged and not closed a seat belt. The indicators include lights, buzzers, and beepers. The switchgear also includes sensors that detect when a person occupies a seat. The sensors cooperate with the indicators so that the indicators inform the driver when an occupied seat has a seat belt not closed, as shown in the prior applications of the inventor as listed in the Cross Reference. For example, the sensors include a pressure switch at each seat that closes when a child sits upon the seat. The closed switch then illuminates an indicator. However, when a child closes a seat belt, properly inserting the male tip into the female buckle, a switch in the female buckle opens, disabling the indicator for that seat. The seat occupied but unbelted indicator can be a light or a buzzer located near the driver.

Figure 3:
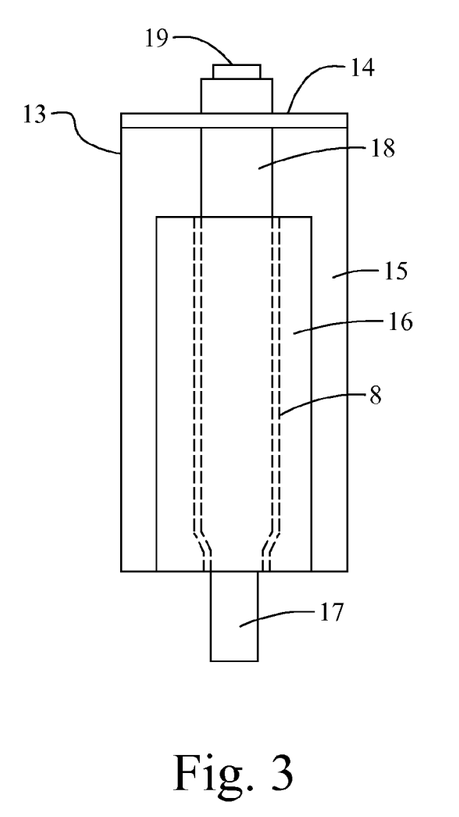
FIG. 3 describes a front view of the solenoid of the invention.
Figure 6:
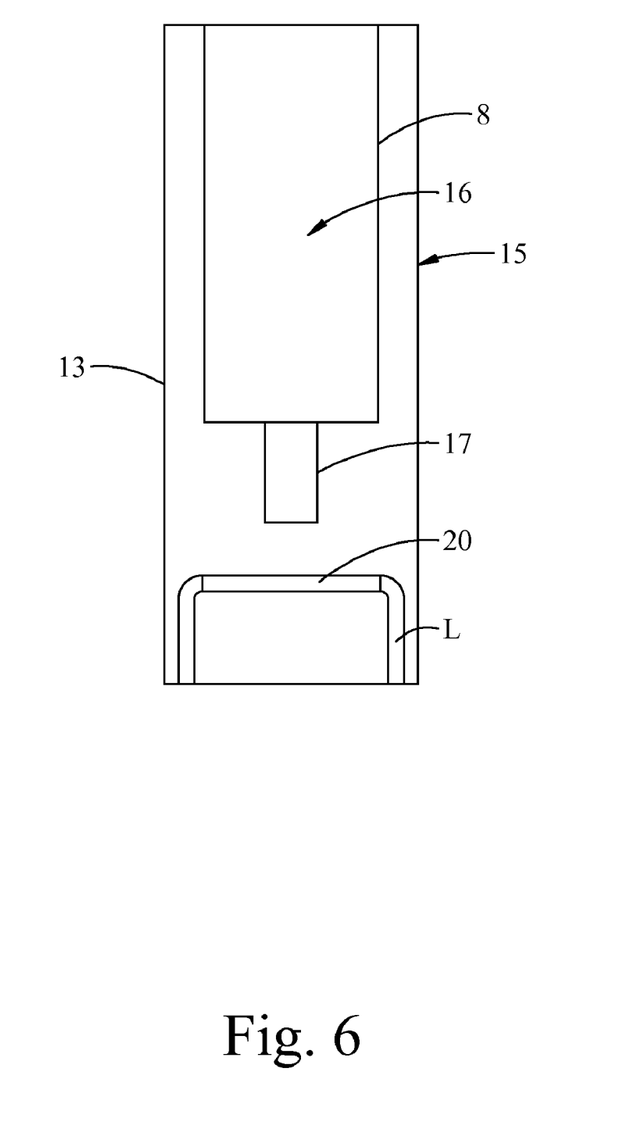
FIG. 6 is a side view of the solenoid locating proximate a belt release.
Figure 7:
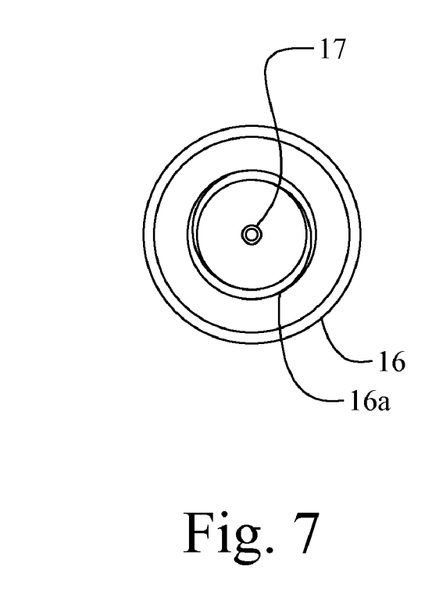
FIG. 7 is a side view of a solenoid with plunger extended.

The solenoids 8, later shown in FIGS. 3-6, attach to a female latch of an existing seat belt, not shown. The solenoids assemble via flanges as shown in FIG. 3 fastened to the seat belt latches, as at L, by mechanical fasteners, such as screws, or adhesive depending on the type of female brackets. FIG. 3 shows a front view of a solenoid 8 that fits upon a bracket 13. The bracket 13, here shown as an angle bracket, has a flange 14 and an edge joined web 15 perpendicular to the flange. The flange has a generally centered aperture that admits an end of the solenoid for securement. The solenoid 8 has a body 16, generally elongated with two opposite ends. One end has a plunger 17 extending outwardly from the body, generally parallel to the web 15, and opposite the flange, and the opposite end has a neck 18 generally cylindrical, passing through the aperture in the flange 14, and coaxial with the plunger. The neck extends outwardly from the body opposite the plunger. The neck terminates in a connector 18 that allows for electrical communication, through wiring, to the remainder of the invention. The solenoids as at 8 have these properties: voltage of 12V direct current, a continuous duty cycle, a stroke for the plunger of 0.75 inches, a dielectric strength of coil of 1000 VRMS, a free floating push type plunger, a 0.6 lb net force developed by the solenoid, and 40 milliamps of current drawn when operating at SIM 12 VDC at +20° C., as shown in FIGS. 6, 7. Upon energizing through the connector 19, the solenoid 8 charges its body 16 so that the plunger 17 instantaneously extends beneath the body to the stroke length of the solenoid as later shown in FIG. 7. In doing so, the plunger presses the female latch L of a seat belt, releasing the belt from the latch so that a user may exit from the seat S.

Figure 4:
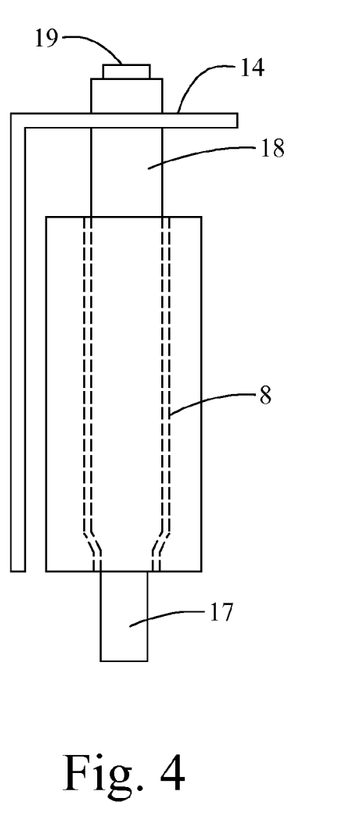
FIG. 4 provides a side view of the solenoid.

FIG. 4 shows the solenoid 8 and the bracket 13 from the side. The solenoid is generally round and has the same appearance when viewed from the front as in the previous figure and the side as in this figure. As above, the solenoid connects its neck 18 through an aperture in the flange 14 of the bracket 13. The solenoid then extends downwardly from the flange as shown and generally parallel to the web 15. Opposite the flange, the solenoid has the plunger 17 capable of extending beyond the web 15. Returning to the flange, the neck extends through the flange so that the connector 19 provides electrical communication from the remainder of the invention to the solenoid.

Figure 5:
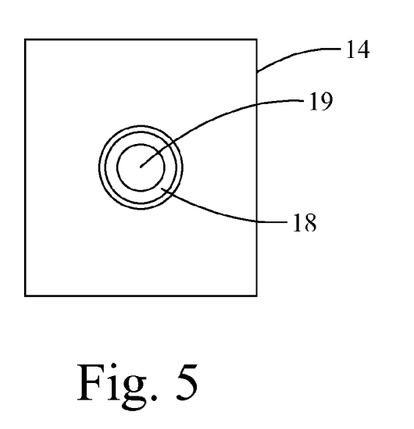
FIG. 5 shows a top view of a solenoid in a mounting bracket.

FIG. 5 shows a top view of the solenoid connected to a bracket 13. The bracket has the top flange 14, here shown as square though a rectangular shape is foresee. The top flange has an aperture that admits the neck 18 of the solenoid 8. The neck has the connector 19 generally centered upon its end outwardly from the flange and the body of the solenoid. The connector then provides electrical communication from the remainder of the invention to the solenoid beneath the flange 14.

Then FIG. 6 shows the solenoid connected to the bracket 13 and the bracket positioned for activating the seat belt release upon the female latch assembly of an existing seat belt, as at L. The solenoid connects to the flange 14 and hands outwardly from the flange parallel to the web 15. The solenoid has its neck completing the securement to the flange and its opposite plunger locating proximate the seat belt release. The plunger is generally located above the release slightly less than the stroke distance, approximately 0.75 inches. Once the solenoid energizes, the plunger abruptly drops from the body 16, depresses a button 20 of the female seat belt release, and thus the male tip of seat belt, not shown, slips from the latch assembly and the seat belt opens so that the occupant moves freely. When a bus with the invention travels normally, occupants of the seats can still open and close the seat belts by hand as is commonly know, even among the young.

FIG. 7 shows a side view of a solenoid 8 separated from a bracket 13. The solenoid has a generally cylindrical body 16 with two opposite ends. One end has a connector 19 with a tab 19a that allows wiring to connect to the solenoid for electrical communication. The other end, opposite the connector, has a threaded fitting 16a extending outwardly from the body 16 generally along the longitudinal axis of the body. The fitting 16a allows for a threaded connection to the latch assembly L at each seat S upon a passenger vehicle B. Extending from the fitting 16a, the solenoid has the plunger 17 here shown narrow and elongated. The plunger has a length at least four times that of its diameter that allows the plunger to reach a button 20 of the release and to extend through the distance the button depresses into the release.

Figure 8:
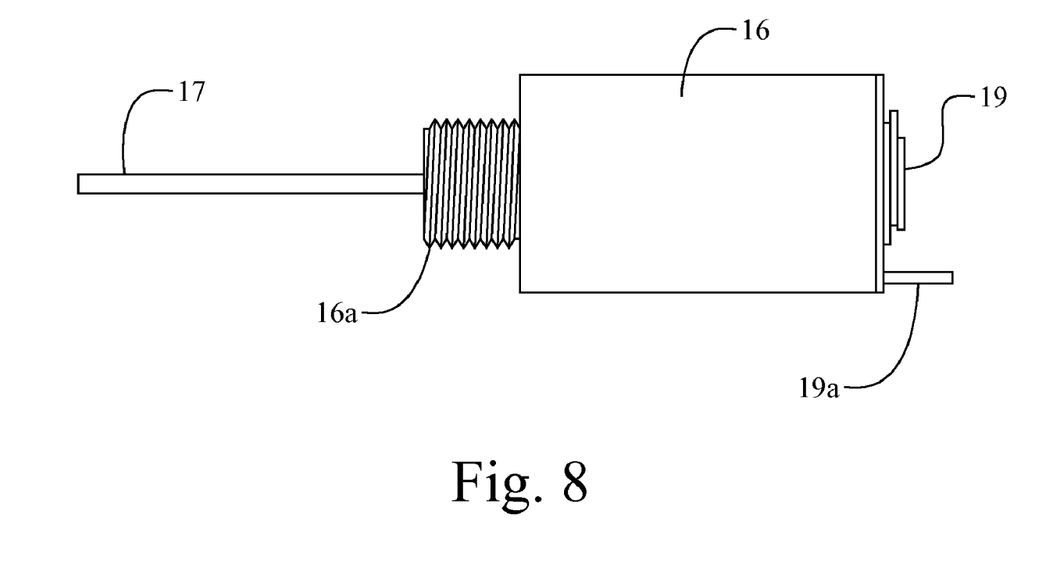
FIG. 8 is a bottom view of a solenoid and its plunger.

FIG. 8 shows a bottom view of the solenoid 8 where the body 16 has a generally round shape. The body has two ends with one end shown here that has the fitting 16. The fitting extends away from the body as shown in FIG. 7. Centered in the fitting, the solenoid has its plunger 17 here shown as round in shape.

Figure 9:
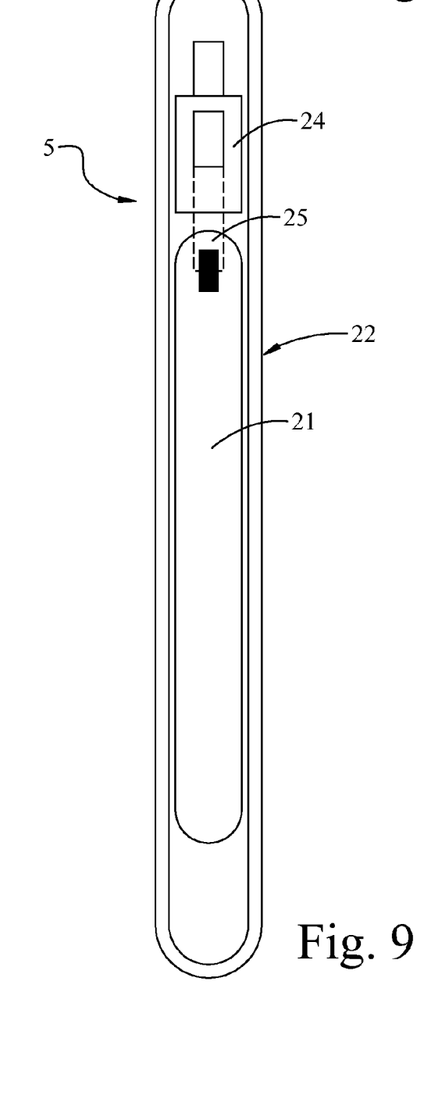
FIG. 9 is a front view of the inertial switch.

FIG. 9 shows a front view of an inertial switch 5. The inertial switch has a rod 21 with a ¼ inch by 8 inch track 23 cut into the rod, or otherwise formed. The rod is preferably one inch acrylic plastic, round, elongated, and with rounded ends. Then a cylinder 22 fits over the solid rod and has an inside diameter of 1⅛ inch and an outside diameter of 1¼ inch. The cylinder is generally round, hollow, elongated, much like a sleeve, and of preferably an acrylic plastic. This sleeve provides a mounting base for a switch 24 that will close the circuit and thus indicate a bus accident. This description of the preferred embodiment utilizes three inertial switches 5 however, additional switches 5 may require installation based upon the length of a bus and the configuration of seats on a particular bus. The switch 24 of the inertia switch 5 is a micro switch, or an equivalent 12V direct current switch, with a roller ball lever 25 that will ride an inner rod 21 and activate when the roller ball drops into a track 23 or groove on a solid inner rod 21. The inner rod 21 attaches to the bumper assembly of the school bus B. An accident involving the bus will then move the rod 21 and its track 23 so that a roller ball 25 drops into the groove, triggering the switch. The outer sleeve 22 also attaches to the frame of the bus. The switch 24 operates as a single pole single throw switch and has parallel wiring to another inertial switch 5 so any inertial switch 5 can the circuit and release the seat belt latch assemblies L so that the free belts allow the children or other passengers to exit the bus or other passenger vehicle.

Figure 10:
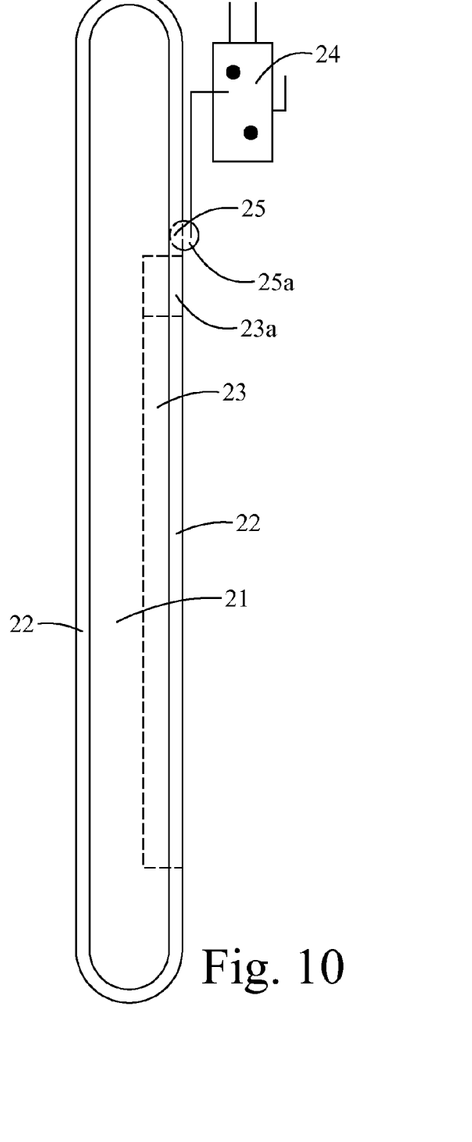
FIG. 10 is a side view of the inertial switch.

Turning the inertial switch, FIG. 10 shows the switch 5 from the side. As above, the switch has a hollow cylinder or sleeve as at 22 that surrounds a rod 21. The rod has a groove or track 23 partially along its length. The groove extends from the surface of the rod inwardly. Proximate the micro switch 24, the groove terminates in a square cut. In line with the groove and slightly above the square cut end, as at 23a, the micro switch has its roller ball lever 25. The roller ball 25a has a radius similar to the depth of the groove. The roller ball generally moves along the surface of the rod 21 and within the sleeve 22. The roller ball lever extends to the micro switch 24 so that when the roller ball rolls and enters the track, as at the end 23a, the roller ball deflects its lever arm thus engaging the micro switch. The micro switch completes a circuit allowing flow of electricity to the solenoids, engaging them so that the plungers advance to depress the buttons 20 at each seat, and releasing the belts from the occupants of the seats.

Figure 11:
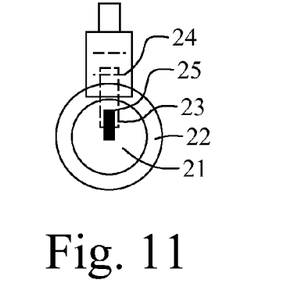
FIG. 11 is an end view of the inertial switch.

And viewing the inertial switch 5 from an end, the micro switch 24 rests upon the sleeve 22. The roller ball lever 25 descends downwardly from the micro switch and towards the rod 21. Here the figure shows the roller ball into the groove 23 so that the switch is closed and the corresponding solenoid engaged opening a seat belt.

However, when a bus enters into a traffic accident and tilts less than approximately 30° from a horizontal plane, the inertial switches 5 activate the system 1 of the present invention through an electronic timer 6 that energizes the solenoids 8 after a predetermined time to release the seat belts from their latches after an accident, of approximately ten seconds to ten minutes. The system 1 also incorporates a level relay 4 that inhibits energizing the system and the solenoids 8 when the bus travels in a normal upright position. The level relay remains in the OFF position when a bus has a normal orientation. The level relay though shifts to the ON position when the bus loses its normal orientation and becomes inverted. The level relay 4 controls automatic activation of the system 1 to prevent opening the seat belts if the school bus has an inverted orientation, that is, up side down. The level relay overrides the signals from any inertial switch when the bus is up side down, or inverted.

From the aforementioned description, a system for simultaneous release of safety belt latches has been described. The device is uniquely capable of allowing each person on a bus to manually open the seat belt latch, providing a bus driver with indicators to monitor passenger usage of seat belts and to show automatic activation of the system, and providing for automatic activation of the system by the bus or other passenger vehicle when the bus does not have an upright orientation following an accident. The system and its various components may be manufactured from many materials, including but not limited to, steel, ferrous and non-ferrous metals, their alloys, select polymers, and composites.

As such, those skilled in the art will appreciate that the conception, upon which this disclosure is based, may readily be utilized as a basis for the designing of other structures, methods and systems for carrying out the several purposes of the present invention. Heretofore, those skilled in the art have not recognized usage of inertial switchgear for automatic release of seat belts when a passenger vehicle such as a bus no longer remains upright following an accident. Therefore, the claims include such equivalent constructions insofar as they do not depart from the spirit and the scope of the present invention.

I claim:

1. A system for releasing a plurality of seat belt latch assemblies from a vehicle, each seat belt latch assembly having a female receptor and a male tip, the vehicle having a plurality of passenger seats having the seat belt latch assemblies, a driver's seat, and a battery, said system comprising:

at least two solenoids, each of said solenoids locating at a passenger seat and positioned proximate a female receptor of a seat belt latch assembly;

at least one sensor in electrical communication to at least one of said solenoids, said at least one sensor interrupting electrical communication to each solenoid until said at least one sensor receives a certain trigger;

at least one control in electrical communication with said at least one sensor, said at least one control delaying activation of said at least one sensor;

wiring providing electrical communication from said solenoids through said at least one sensor and said at least one control to the battery of the vehicle;

said at least one sensor including a fuse, a level relay, and at least two inertia switches mutually wired in parallel;

said at least one control including a level switch, a timer, and a mechanical hold switch;

said mechanical hold switch having a load side in electrical communication with said solenoids and delivering voltage to said solenoids, and said switch locating proximate to the driver's seat; and, an electronic timer in communication with one of said inertia switches wherein said timer energizes said solenoids after a predetermined time.

2. The release system of claim 1 further comprising:
said inertia switches activating when tilted less than approximately thirty degrees.

3. The release system of claim 1 wherein said mechanical hold switch provides indication to a driver of the vehicle when a seat has been occupied that has a seat belt latch assembly disengaged.

4. The release system of claim 2 further comprising:
said inertia switches including a rod, a sleeve fitting around and along said rod, a micro switch with roller ball lever upon said sleeve in communication with said rod, and said sleeve adapted to connect to the vehicle.

5. The release system of claim 4 further comprising:
said rod having a lengthwise track receiving said roller ball lever and said rod being plastic.

6. The release system of claim 2 further comprising:
said timer having a predetermined time of approximately one second to approximately ten minutes prior to energizing said solenoids.

7. A system for releasing a plurality of seat belt latch assemblies from a vehicle, each seat belt latch assembly having a female receptor and a male tip, the vehicle having a plurality of passenger seats having the seat belt latch assemblies, a driver's seat, and a battery, said system comprising:

at least two solenoids, each of said solenoids locating at a passenger seat and positioned proximate a female receptor of a seat belt latch assembly;

at least one sensor in electrical communication to at least one of said solenoids, said at least one sensor interrupting electrical communication to each solenoid until said at least one sensor receives a certain trigger;

at least one control in electrical communication with said at least one sensor, said at least one control delaying activation of said at least one sensor; and wiring providing electrical communication from said solenoids through said at least one sensor and said at least one control to the battery of the vehicle said at least one sensor including a fuse, a level relay, and at least one inertia switch;

said at least one control including a level switch, a timer, and a mechanical hold switch;

a circuit A having a level relay and at least one level switch wherein said level relay delivers power to said at least one inertia switch that energizes said timer regulating closing of a timer control contact that delivers power to said solenoids to release the seat belt assemblies; and, a circuit B having said mechanical hold switch deliver power through said level switch then to said solenoids.

8. A system for releasing a plurality of seat belt latch assemblies from a vehicle, each seat belt latch assembly having a female receptor and a male tip, the vehicle having a plurality of passenger seats having the seat belt latch assemblies, a driver's seat, and a battery, said system comprising:

at least two solenoids, each of said solenoids locating at a passenger seat and positioned proximate a female receptor of a seat belt latch assembly;

at least one sensor in electrical communication to at least one of said solenoids, said at least one sensor interrupting electrical communication to each solenoid until said at least one sensor receives a certain trigger;

at least one control in electrical communication with said at least one sensor, said at least one control delaying activation of said at least one sensor;

wiring providing electrical communication from said solenoids through said at least one sensor and said at least one control to the battery of the vehicle:

wherein said solenoids each attach to a bracket, said bracket having an inverted L shape extending over the female receptor of a seat belt latch assembly, said bracket having a web and a perpendicular flange, each of said solenoids attaching to said web and extending downwardly generally parallel to said flange; and, wherein each of said solenoids has a plunger extending axially for an approximately 0.75 inch stroke, each of said plungers extends and presses the female receptor of a seat belt latch assembly thus opening said assembly.

9. The release system of claim 8 wherein each of said solenoids has a neck opposite said plunger, each of said necks extends through said web of said bracket and wherein said neck maintains electrical communication from said solenoid to said system.

10. A system for releasing a plurality of seat belt latch assemblies from a vehicle, each seat belt latch assembly having a female receptor and an engaging male tip, the vehicle having a plurality of passenger seats having the seat belt latch assemblies, a driver's seat, and a battery, said system comprising:

at least two solenoids, each of said solenoids locating at a passenger seat and positioning proximate a female receptor of a seat belt latch assembly;

a circuit A having at least one sensor in electrical communication to at least one solenoid, said at least one sensor interrupting electrical communication to said solenoids until said at least one sensor receives a certain trigger, at least one control in electrical communication with said at least one sensor, said at least one control delaying activation of said at least one sensor;

a circuit B having a mechanical hold switch deliver power through said level switch then to said solenoids;

wiring providing electrical communication adapted to provide communication from the battery to said circuit A and said circuit B wherein power reaches said at least two solenoids through said at least one sensor and said at least one control;

said circuit A having a fuse, a level switch, a level relay in communication with said level switch, a timer, a timer control contact in communication with said timer, at least two inertia switches energizing said timer and regulating the closing of said timer control contact delivering power to said solenoids to release the seat belt assemblies, said level relay having an off position when the vehicle has a generally upright orientation and an on position when the vehicle has an inverted position wherein said level relay prevents automatic activation of said system when the vehicle is inverted; and, said circuit B having a mechanical hold switch having a load side in electrical communication with said at least two solenoids, and said switch locating proximate to the driver's seat;

wherein said circuit A provides for automatic operation of said system and said circuit B provides for manual operation of said system.

11. The seat belt latch release system of claim 10 further comprising:

said inertia switches activating when tilted less than approximately thirty degrees;

each of said inertia switches including a rod, a sleeve fitting around and along said rod, a micro switch with roller ball lever upon said sleeve in communication with said rod, said sleeve adapted to connect to the vehicle, said rod having a lengthwise track receiving said roller ball lever;

said timer having a predetermined time of approximately one second to approximately ten minutes prior to energizing said solenoids; and, said mechanical hold switch indicating to a driver of the vehicle when an occupied seat has a disengaged seat belt latch assembly.

\* \* \* \* \*